US008218930B2

(12) United States Patent
Pettit

(10) Patent No.: US 8,218,930 B2
(45) Date of Patent: Jul. 10, 2012

(54) HIGH-RELIABILITY OPTICAL FIBER HAVING A NANOCOMPOSITE COATING

(76) Inventor: John W. Pettit, Rockville, MD (US)

( * ) Notice: Subject to any disclaimer, the term of this patent is extended or adjusted under 35 U.S.C. 154(b) by 1744 days.

(21) Appl. No.: 11/397,933

(22) Filed: Apr. 5, 2006

(65) Prior Publication Data

US 2009/0208743 A1    Aug. 20, 2009

Related U.S. Application Data

(60) Provisional application No. 60/668,075, filed on Apr. 5, 2005.

(51) Int. Cl.
*G02B 6/00* (2006.01)
*G02B 6/36* (2006.01)
(52) U.S. Cl. .............. 385/128; 385/141; 427/163.1
(58) Field of Classification Search .............. None
See application file for complete search history.

(56) References Cited

U.S. PATENT DOCUMENTS

| | | | |
|---|---|---|---|
| 6,256,438 | B1 | 7/2001 | Gimblet |
| 6,845,788 | B2 | 1/2005 | Extrand |
| 2003/0108935 | A1* | 6/2003 | Wang et al. ............. 435/6 |
| 2004/0042750 | A1* | 3/2004 | Gillberg et al. ........ 385/128 |
| 2005/0063652 | A1* | 3/2005 | Johnson et al. ........ 385/123 |
| 2007/0041887 | A1* | 2/2007 | Veedu et al. ........... 423/447.2 |

OTHER PUBLICATIONS

A. Dalton, et al., "Super Tough Carbon Nanotube Composite Fibers for Electronic Textiles", University of Texas at Dallas, pp. 1-5.
A. Brody, "Nano and Food Packaging Techologiex Converge", Foodtechnology, Mar. 2006, pp. 92-94.
S. Hildebrandt, "Nanocomposites Improve Package Properties".
S. Kumar, et al., "Polymer/Carbon Nanotube Composites: Challenges and Opportunities", Georgia Institute of Technology.
S. Kumar, "Polymer/Carbon Nanotube Composites: Challenges and Opportunities", Georgia Institute of Technology.
C. Park, et al., "Polymer-Single Wall Carbon Nanotube Composites for Potential Spacecraft Applications", NASA/CR-2002-211940, ICASE Report No. 2002-36, Oct. 2002, pp. 1-7.
K. Lau, et al., "Superhydrophobic Carbon Nanotube Forests", Nano Letters, pp. 1-21.
Y. Shiue, et al., "Apparent Activation Energy of Fused Silica Optical Fibers in Static Fatigue in Aqueous Environments", Journal of the European Ceramic Society 22 (2002), pp. 2325-2332.
G. Glaesemann, "Advancements in Mechanical Strength and Reliability of Optical Fibers", SPIE Critical Reviews, vol. CR73, Reliability of Optical Fibers and Optical Fiber Systems Sep. 20-21, 1999, Boston, Massachusetts, pp. 1-23.
M. Matthewson, et al., "Cyclic Fatigue of High Strength Optical Fibers in Bending", Proceedings of SPIE, vol. 4215, 2001, pp. 53-59.
"Structure-Based Carbon Nanotube Sorting by Sequence-Dependent DNA Assembly", Zheng, et al., Science, Nov. 28, 2003 (Abstract).
International Search Report dated Jul. 25, 2007.
"Squeezing light from nanotubes", Michael Kanellos, CNET News. com, May 1, 2003.
J. Mrotek, et al., Diffusion of Moisture Through Optical Fiber Coatings, Journal of Lightwave Technology, vol. 19, No. 7, Jul. 2001, pp. 988-993.
J. Mrotek, et al., Diffusion of Moisture Through Fatigue and Aging-Resistant Polymer Coatings on Lightguide Fibers, Journal of Lightwave Technology, vol. 21, No. 8, Aug. 2003, pp. 1175-1778.

* cited by examiner

*Primary Examiner* — Charlie Peng
*Assistant Examiner* — Mary El Shammaa
(74) *Attorney, Agent, or Firm* — Blank Rome LLP

(57) ABSTRACT

An optical fiber is coated with a super-hydrophobic carbon nanotube film, or other film containing a nanocomposite material, to increase reliability. The film is formed from a carbon nanotube dispersion, which is in turn formed from a mixture of water, carbon nanotube gel, and a polymer such as single stranded DNA of a repeating sequence of the base pairs GT with a length of 20 base pairs, which is sonicated and then ultracentrifuged.

34 Claims, 2 Drawing Sheets

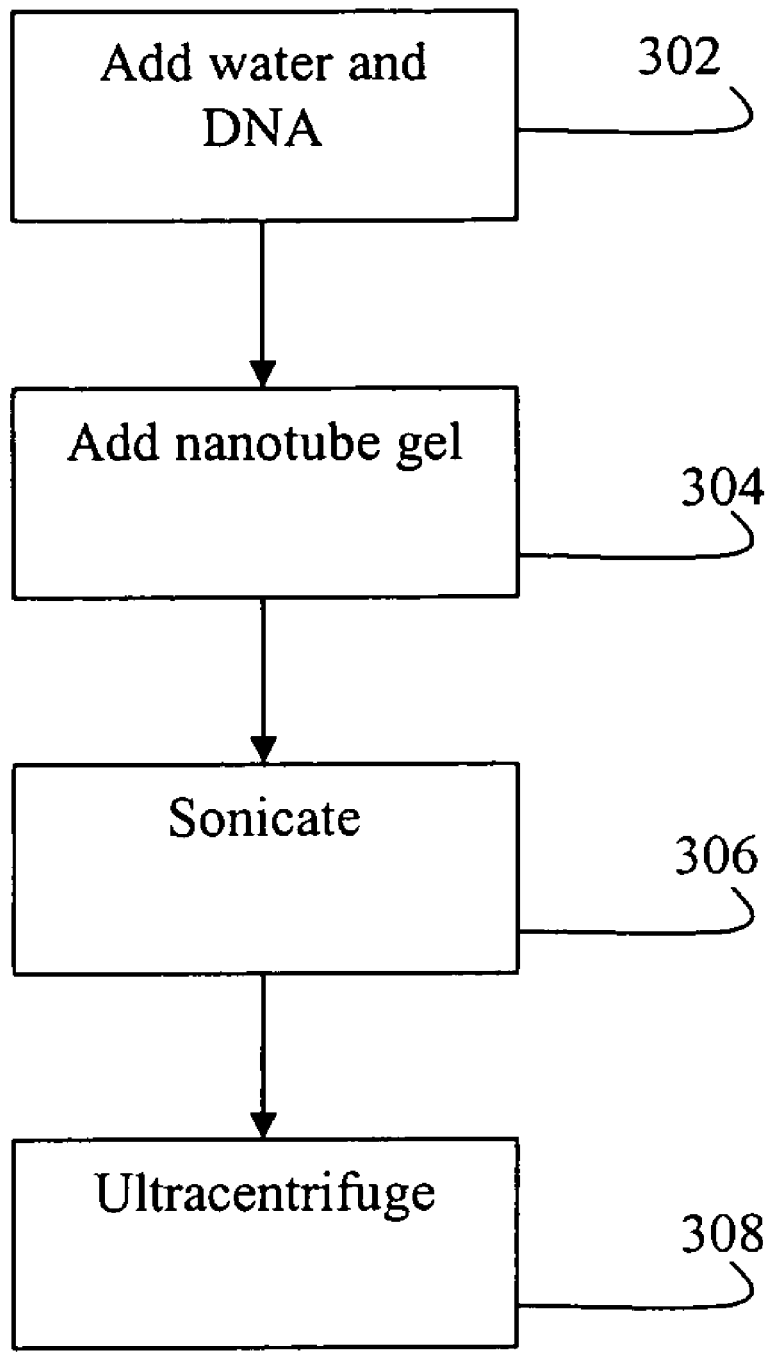

HIGH-RELIABILITY OPTICAL FIBER HAVING A NANOCOMPOSITE COATING

REFERENCE TO RELATED APPLICATION

The present application claims the benefit of U.S. Provisional Patent Application No. 60/668,075, filed Apr. 5, 2005, whose disclosure is hereby incorporated by reference in its entirety into the present disclosure.

FIELD OF THE INVENTION

The present invention is directed to an optical fiber and more specifically to an optical fiber having thereon a nanocomposite coating or a carbon nanotube containing coating, or a combination of such coatings for increased reliability, service lifetime, wear resistance and environmental protection.

DESCRIPTION OF RELATED ART

Fiber optic networks employing wavelength division multiplexing (WDM) technology are desirable for control of aircraft and many other vehicles including undersea vehicles, military tanks and space vehicles. The reliability, inherent tolerance to adverse conditions and immunity to electromagnetic interference or EMI make fiber optic technology a very attractive alternative to conventional electric or hydraulic control. However, any optical system can only be as reliable as the fiber itself. Since proposed fiber optic WDM systems rely on the optical fiber to carry enormous amounts of data over a few small fibers, the reliability requirements for the fiber itself are very high and the failure of even a single optical fiber could be disastrous.

Review of the operational experience thus far with fiber optic control in spacecraft, such as the International Space Station (ISS), US Navy submarines, and the US Air Force F-18 fighter plane, reveal significant issues with respect to optical fiber reliability. Surprising, even stunning, failure modes have been experienced that have profound implications on the deployment of fiber optic technology. Even when initially good optical fiber had been stored in temperature controlled environments and not even put into use for a several month period, numerous failures were detected when the fibers were reexamined. When optical fiber fails it is almost always catastrophic, in that the fiber fractures and fails to transmit light. In some instances the optical absorption may increase and degrade performance, which could potentially be accommodated to one degree or another, but the typical failure mode is a complete fracture of the fiber. These fractures have been termed "rocket engine defects" by those evaluating optical fiber failures on the International Space Station, ISS, not because these failures had anything to do with the rocket engine, but because an examination of these failures revealed a type of fracture that resembled in appearance a rocket engine plume [Reference: ISS Fiber Optic Failure Investigation Root Cause Report April, 2000]. These failures were caused by a stress enhanced corrosion where moisture or another foreign molecule that makes its way to the fiber's surface adheres to very small surface defects that are present on the fiber. Over a period of time, a chemical reaction takes place that builds up stress that gives rise to the formation of a stress crack from the fiber's surface toward the center of the fiber. This crack builds up to a critical value at which point it completely fractures the optical fiber in an abrupt manner. This process happens even when the fiber is at rest and stored in atmospherically controlled environments prior to fabrication, but is dramatically enhanced when the fiber is subjected to dynamic environments, such as vibration, tension, temperature, and humidity. Defects on the fiber surface where moisture or other materials may begin this process that are of such small size that this process is not likely to occur are termed non-critical, or sub-threshold. However, it has been found that under dynamic environments, such as in aircraft, space vehicles, land vehicles and sea vehicles, this sub-critical threshold is much smaller so that defects that would not otherwise cause a problem would indeed cause this problem in dynamic environments [Reference: "Stress Dependent Activation Entropy for Dynamic Fatigue of Pristine Silica Optical Fibers" by Shiue and Matthewson, Feb. 9, 2001 and "Cyclic Fatigue of High Strength Optical Fibers in Bending" by Matthewson and Padiyar, 2001].

An essentially universal method of attempting to assure optical fiber quality is to impose a stress on the fiber called a "proof test", which subjects the fiber to a certain stress to eliminate fiber that cannot withstand the imposed level of proof stress. In a study conducted by Corning, advancements in the mechanical strength and reliability of optical fibers were reviewed. This report relates that concern over fiber failures due to stress has been an issue for decades. These concerns have been mitigated by the advent of loose tube cable design. The report further relates that recently this concern has been brought to the forefront due to the proliferation of constricted cable designs such as tight buffer and ribbon. Even for loose cable designs, with the cable subjected to the rated installation load for one hour, fibers will exhibit a maximum tensile strain of 60% of the fiber proof strain. Recent strength testing results showed that a proof stress level flaw will fail in minutes if loaded to 60% of the proof stress. This was an alarming conclusion for the commercial fiber optic industry and certainly underscores the point that optical fiber manufactured for commercial purposes is inadequate for dynamic applications, such as "Fly-by-Light" and similar purposes.

The mechanical reliability of optical fibers is usually assessed using the sub-critical crack growth model for fatigue in which ambient moisture preferentially attacks the strained bonds around stress-concentrating surface defects. The most severe defects extend until they reach the critical size for fast fracture and failure of the optical fiber ensues. This fatigue process is usually thought of as a stress-assisted chemical reaction between water and silica and therefore depends on the nature of the environment. Fatigue occurs higher at higher temperature and higher water levels. It is also known to proceed faster with any solutes in the water. Proof testing of the optical fiber at the time of manufacture is a common method to locate and eliminate the major defects in the fiber, but this method subjects the fiber to stress which causes additional defects. During service additional stress causes surviving defects to propagate and leads to fiber failure.

Optical fiber manufacturers emphasize the importance of handling optical fiber during manufacture, testing, storage and installation, as various sources of defects can arise during these processes. NASA and the Boeing Company extensively studied the sources of optical fiber failure onboard the International Space Station (ISS). Catastrophic fiber failures were attributed to defects in the fiber that were termed "rocket engine" defects to describe their appearance. The polyimide coated fiber provided defect sites that gave rise to a hydrofluoric acid etching of the glass fiber that ultimately caused the fiber's failure. In many cases, fibers that had not been put into service and were initially tested to be optically intact failed while sitting on the shelf.

Defects that have a certain critical size or entropy give rise to fiber failure quickly with very little applied stress. Defects below this size grow much more slowly until this critical size is reached and at that time the fiber will quickly fail.

A mathematical model has been developed to characterize sub-critical defects that has been used in numerous research reports termed the "sub-critical crack growth model." The sub-critical crack growth model has been applied to cyclic stresses at frequencies of from 10 to 100 Hertz. Cyclic stress at frequencies of about 10 Hertz are due to turbulent airflow past aerial cables, about 100 Hertz from vehicle motion and 1000 Hertz from vibrating machinery. A characteristic of cyclic stress is that the fatigue rate is more dependent on the stress amplitude than on the mean stress. Damage is introduced on each stress cycle, and so the failure criterion is one of cycles to failure, as opposed to time to failure. The effect of a dynamic environment can be interpreted as a lowering of the entropy of a defect, and this gives rise to much greater failure rates under this type of environment. Effectively, a defect that was not at critical size under no cyclic stress will potentially become critical under cyclic stress. Additionally, the polyimide coating on polyimide coated fibers has been observed to crack under cyclic conditions. Elevated temperatures greatly increase even the zero stress aging of optical fibers.

Therefore, the combined effects of cyclic stress, higher temperature and possibly higher moisture content make the dynamic environment much worse for optical fiber reliability. This, coupled with the even greater need for reliability of the optical fiber in applications such as "Fly-by-Light," where a single fiber failure could potentially cause the loss of an aircraft, makes the issue of fiber reliability an even more significant problem.

The following steps can be taken during the manufacture of optical fiber to enhance its reliability for dynamic environments such as Air Force "Fly-by-Light" application.

Take extra care to remove any surface contamination on the fiber

Acid etch or flame polish the fiber to remove surface cracks and defects

Utilize the highest strength fiber possible, since defect rate correlates strongly with fiber strength Design handling equipment and processes to not create any defects in the fiber Reduce or eliminate the "proof test" procedure and utilize nondestructive methods of flaw detection, such as optical means Control the application of coating materials to tighter tolerances Design cable jackets and ribbons to reduce stress and more evenly apply stress Vendors can be evaluated and negotiated with to perform the above steps to a more rigorous aerospace appropriate specification. All of the above factors have been found to contribute significantly to reduced optical fiber reliability, especially in higher temperature, potentially higher moisture and certainly higher vibration environment of the aerospace application.

Ultimately, superior coatings will be needed that offer substantially better protection to the optical fiber to make significant steps forward in fiber reliability. A hermetic seal is very important to prevent corrosion from water. It is felt that aluminum coatings offer a true hermetic seal, but it has been found that aluminum coated fibers in fact have a lower strength possibly due to chemical reaction with the silica. Inorganic coatings offer stability against moisture and acid, but the strength of the fiber is reduced. Carbon fiber and diamond particle coatings have been used to offer very good moisture barrier protection to optical fibers.

SUMMARY OF THE INVENTION

It is therefore an object of the present invention to overcome the above-noted deficiencies of the prior art.

To achieve the above and other objects, the present invention is directed to a technique for using carbon nanotube containing films and coatings or other types of nanocomposites to achieve a higher degree of optical fiber protection. Carbon nanotubes, with their extremely high axial modulus and high surface to volume ratio, offer the promise of both fiber strength enhancement and extraordinary moisture and acid barrier properties, even for composites containing only a small percentage of carbon nanotubes. Carbon nanotube containing films have already been reported to be super-hydrophobic and nanocomposites have been recently used in the food and pharmaceutical packaging industry to keep oxygen, moisture and other from materials entering and causing the food or pharmaceutical to spoil. Thus, such films provide extremely good protection when applied to optical fibers [Reference: "Superhydrophobic Carbon Nanotube Forests" by Kenneth K. S. Lau et. al. Nano Letters].

One of the challenges in making nanocomposites is the fact that nanomaterials have large tendencies to stick and clump together, which prevents effective composite formation. The nanomaterials need to be uniformly and evenly dispersed so that physical loads may be transferred to the nanomaterial to obtain strength advantages, and the nanomaterial's other desirable properties of forming barriers to moisture, oxygen and other intruding atoms and molecules may be realized. A technique has been found for creating superb nanotube dispersions that can be used to apply uniform nanotube film coatings or to make effective composites with polymers and other substances on the optical fiber [Reference: Ming Zheng et. al. Science Volume 302 28 Nov. 2003]. That technique, based on published techniques developed at Dupont, involves the use of a single strand of DNA which is wound around the nanotubes. That causes the nanotubes to go from aggregating at the bottom of the liquid to being evenly dispersed therein. Once the dispersion is formed, it can be used as one method to coat optical fibers with carbon nanotubes.

Polymers such as polyimide and acrylic have been used as coatings on optical fiber to provide moisture barrier and strength as well as other necessary and practical properties so that optical fiber will provide reliable operation. It is known that small amounts, as low as fractions of a percent of carbon nanotubes added to polymers will dramatically enhance the polymers characteristics and capabilities. Small amounts of carbon nanotubes added to these and other polymers will enhance the moisture barrier properties of the coating as well as add strength to the fiber and enhance its ability to withstand cyclic stresses resulting from vibration and bending, especially in dynamic environments. Furthermore, polymers other than DNA have been found to be useful in making carbon nanotubes disperse, so that these polymers can have the dual role of being a means of dispersing the carbon nanotubes as well as the polymer base for the carbon nanotube composite that is coated around the optical fiber.

Carbon nanotubes have been found to be able to draw up into the carbon nanotube many substances and act like nanoscale syringes. Water molecules can be drawn into carbon nanotubes. When carbon nanotubes are used as a component of the coating around the optical fiber this becomes another method by which the carbon nanotubes will add to the reliability of the optical fiber. In effect, the carbon nanotube behaves as a scavenger for water molecules and other molecules that might otherwise find themselves going to the surface of the optical fiber and starting the process of stress corrosion that ultimately causes the optical fiber to fail. Carbon nanotubes can be prepared to draw up water or any other invading substance and thereby prevent such a substance from reaching the optical fiber. The preparation typically involves cutting off the end caps of the nanotubes so that they are open as opposed to being closed tubes with hemispherical end caps.

Carbon nanotube based composites have been recognized to offer conductivity to an otherwise insulating polymer coating, as well as greatly enhanced strength, thermal stability, wear resistance and hydrophobic properties, all of which are a great advantage for a coating around an optical fiber. During the investigation into the optical fiber failures onboard the International Space Station (ISS) it was discovered [Reference: ISS Root Cause Report] that during the manufacturing process large buildups of static electricity during fiber manufacture were the fundamental cause of the failures. This was due to the occasional breakdown of the insulating polymer coating due to high electric fields generated in such small dimensions from the static electricity and this caused numerous defects that allowed for the intrusion of acids, moisture and other materials that initiated the stress induced corrosion process that is well covered in the ISS Root Cause Report. A conductive coating, which a carbon nanotube composite can provide, will eliminate this buildup of static electricity by dissipating the charge that is induced during the manufacturing process or while in storage or use.

One known deficiency with polymer coatings on optical fibers that can offer moisture barrier properties is the low strength of these coatings. This is detrimental because high strength is needed due to the stresses and strains put on the optical fiber during manufacture when the fiber is drawn and pulled through the various stages of manufacture, but during installation where the optical fiber is pulled through passages over long distances, etc. Carbon nanotube based composites offer greatly enhanced strength for even low concentrations of carbon nanotubes within the composite and offer greatly enhanced wear resistance, thermal stability due to the high coefficient of thermal conductivity of carbon nanotubes, which is as high a diamond, which has the highest thermal conductivity of any known substance. These properties of a carbon nanotube composite and nanocomposites formed by other nanomaterials combined with host substances will greatly enhance the reliability, service lifetime, wear resistance and allow optical fibers to be employed in dynamic environments such as aircraft, vehicles, and machinery where cyclic stresses, vibration, environmental factors of temperature, pressure and humidity are encountered.

Nanocomposites formed of nanomaterials in certain clay hosts have recently been used in food packaging applications to give the package greatly enhanced moisture and oxygen barrier properties. This greatly enhanced the shelf life of the food and keeps it fresh by preventing the chemical breakdown and spoiling that occurs when food comes into contact with these substances. Coating made from these nanocomposites will enhance the reliability of optical fiber by forming a barrier to moisture and other intruding substances and thereby preventing the stress induced corrosion failure process described in the ISS Root Cause Report.

Optimum combinations of carbon nanotubes, polymers, nanomaterials and other host substances, generically termed nanocomposited can be created and applied either separately in different layers around the optical fiber or by being mixed together in one combined coating that has all of the properties needed for any given end use application of the optical fiber. For instance, a nanocomposite coating made of a nanomaterial in a clay host may be coated around the optical fiber to offer the best moisture barrier protection. This could then be followed by a second coating of carbon nanotubes in a polymer host to create a composite that gives greatly enhanced strength, wear resistance, electrical conductivity, thermal stability and additional moisture barrier protection. Alternatively the carbon nanotube polymer coating could be applied first to give electrical conductivity and strength to the fiber at an earlier stage in the manufacturing process to make certain that defects are not caused during manufacturing, as reported in the ISS Root Cause Report. The nanocomposite containing nanomaterials and clay could then be applied to give further enhanced barrier protection to moisture, oxygen and other substances.

BRIEF DESCRIPTION OF THE DRAWINGS

A preferred embodiment of the invention will be set forth with reference to the drawings, in which:

FIG. 3 is a flow chart of a process for forming the carbon nanotube dispersion used in the process of FIG. 2.

DETAILED DESCRIPTION OF THE PREFERRED EMBODIMENT

Figure 1:
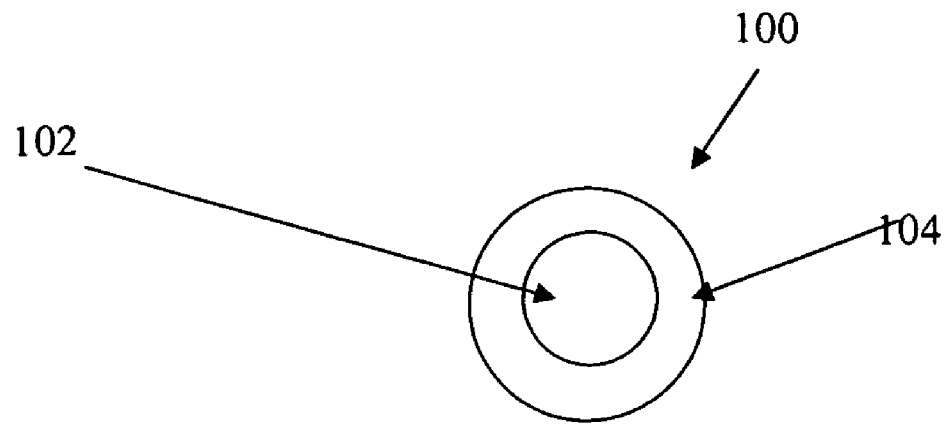
FIG. 1 is a cross-sectional view of a carbon nanotube assembly according to the preferred embodiment.

A preferred embodiment of the present invention will be set forth in detail with reference to the drawings, in which like reference numerals refer to like elements or steps throughout.

FIG. 1 shows a cross section of a coated optical fiber 100 according to the preferred embodiment. The coated optical fiber 100 includes an optical fiber 102 having a carbon nanotube containing film 104 applied thereto.

Figure 2:
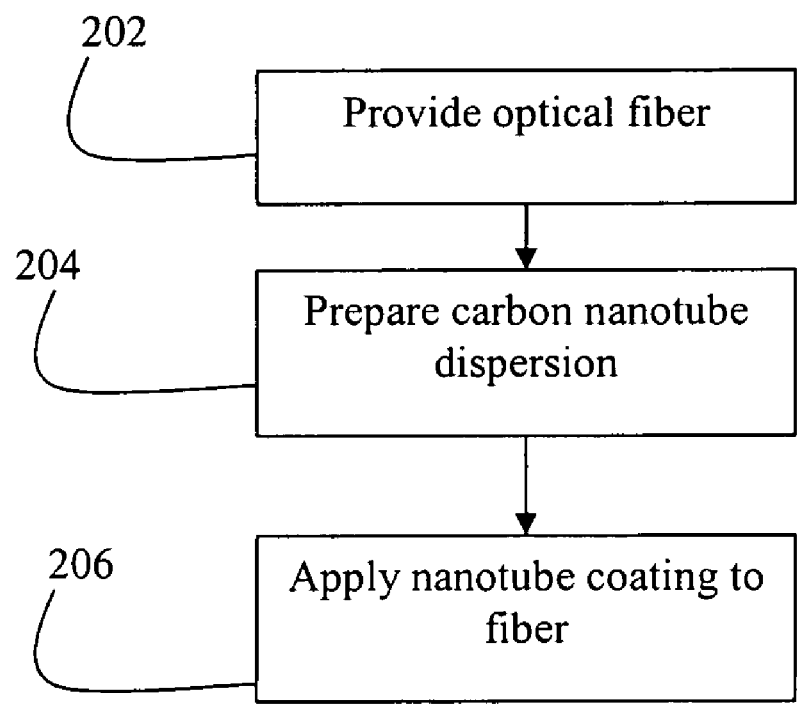
FIG. 2 is a flow chart of a process for making the carbon nanotube assembly of FIG. 1.

FIG. 2 is a flow chart showing a technique for applying the carbon nanotube film 104 of FIG. 1. In step 202, the optical fiber 102 is provided. In step 204, a carbon nanotube dispersion is prepared. In step 206, the dispersion is used to apply a carbon nanotube coating 104 to the fiber 102 to form the coated fiber 100.

A preferred process for carrying out step 204 of forming the dispersion has been developed as part of the present invention to overcome a known problem with nanotube films. More specifically, in applying a nanotube film, there is the problem that is almost universally reported by nanotube researchers and has been a major impediment to nanotube research. This is the fact that nanotubes have such high Van der Walls forces that they adhere strongly to one another and form clumps or rope like masses that do not go into solution with almost all known solvents. Published papers have reported that isopropanol is an effective solvent for nanotubes, but when the inventor tried this, the nanotubes simply settled to the bottom of the vial in tiny little clumps and did not disperse or go into solution at all. Other researchers have confirmed this.

Fortunately, a recent research paper has reported that single stranded DNA wraps itself around carbon nanotubes in such a way to make the nanotubes disperse in ordinary water. The inventor, working with the Chemistry Department of the University of Virginia, procured single stranded DNA for use in nanotube separation experiments. Single stranded DNA of a repeating sequence of the base pairs GT with a length of 20 base pairs was procured because one research report suggested that this sequence provided an optimum spacing between charge centers along the DNA to match with the nanotubes fortuitously and wrap completely around the carbon nanotubes. Following the protocol recently published by Zheng at E.I. du Pont de Nemours and Company, (*Nature Materials*, Volume 2, 2003 pages 338-342) the inventor prepared a nanotube dispersion in a manner that will now be explained with reference to the flow chart of FIG. 3. In step 302, 500 microliters of de-ionized water was added to 10 milligrams of 20(GT) SS DNA. Then, in step 304, 10 milligrams of nanotube gel was added. This mixture was sonicated in step 306 at a power level of 3 Watts for one hour with an ice water bath. The results were excellent. The solution turned into what looked like a black ink with no matter settling to the bottom. An ultracentrifuge was used in step 308 to separate out any un-dissolved matter, and after two hours of ultracentrifugation no undissolved matter was seen, indicating that complete dispersion of the nanotubes was apparently achieved. This is a major step forward for nanotube research and design of devices with nanotubes. Nanotubes that are not dispersed in a solvent will cling together with large attractive forces, making the clumps optically opaque and useless for device fabrication or separation or almost any other application.

Of course, any other suitable technique for forming a nanotube dispersion can be used instead.

While a preferred embodiment of the present invention has been set forth above, those skilled in the art who have reviewed the present disclosure will readily appreciate that other embodiments can be realized within the scope of the present invention. For example, numerical values are illustrative rather than limiting. Therefore, the present invention should be construed as limited only by the appended claims.

I claim:

1. An optical fiber assembly comprising:
   an optical fiber; and
   a film surrounding the optical fiber, the film comprising a nanomaterial, wherein the film is a nanocomposite film comprising the nanomaterial, and wherein the nanomaterial comprises a carbon nanotube material.

2. The assembly of claim 1, wherein the film is superhydrophobic.

3. The assembly of claim 1, wherein the film comprises carbon nanotubes and DNA.

4. The assembly of claim 3, wherein the DNA comprises single-stranded DNA.

5. The assembly of claim 4, wherein the single-stranded DNA comprises single-stranded DNA of a repeating sequence of base pairs GT.

6. The assembly of claim 5, wherein the repeating sequence has a length of 20 base pairs.

7. The assembly of claim 1, wherein the film comprises carbon nanotubes and a polymer.

8. The assembly of claim 7, wherein the polymer comprises a polyimide polymer.

9. The assembly of claim 7, wherein the polymer comprises an acrylic polymer.

10. The assembly of claim 1, wherein the carbon nanotube material comprises carbon nanotubes and water molecules within the carbon nanotubes.

11. The assembly of claim 1, comprising a plurality of said films.

12. A method for protecting an optical fiber, the method comprising:

(a) providing the optical fiber; and
(b) applying a film onto the optical fiber so that the film surrounds the optical fiber, the film comprising a nanomaterial, wherein the film is a nanocomposite film comprising the nanomaterial, and wherein the nanomaterial comprises a carbon nanotube material.

13. The method of claim 12, wherein step (b) comprises preparing a nanotube dispersion.

14. The method of claim 13, wherein the nanotube dispersion is formed by:
   (i) combining carbon nanotubes, a polymer, and a solvent to form a mixture; and
   (ii) forming the dispersion from the mixture.

15. The method of claim 14, wherein the solvent comprises water.

16. The method of claim 15, wherein the polymer comprises DNA.

17. The method of claim 16, wherein the DNA comprises single-stranded DNA.

18. The method of claim 17, wherein the single-stranded DNA comprises single-stranded DNA of a repeating sequence of base pairs GT.

19. The method of claim 18, wherein the repeating sequence has a length of 20 base pairs.

20. The method of claim 19, wherein step (b)(ii) comprises sonicating the mixture.

21. The method of claim 20, wherein step (b)(ii) further comprises centrifuging the mixture after the mixture is sonicated.

22. The method of claim 12, wherein the film comprises carbon nanotubes and a polymer.

23. The method of claim 22, wherein the polymer comprises a polyimide polymer.

24. The method of claim 22, wherein the polymer comprises an acrylic polymer.

25. The method of claim 12, wherein the carbon nanotube material comprises carbon nanotubes prepared for the purpose of trapping water molecules and other intruding substances within the carbon nanotubes.

26. The method of claim 12, wherein step (b) comprises applying a plurality of said films.

27. A method of forming a carbon nanotube dispersion, the method comprising:
   (a) combining carbon nanotubes, a polymer, and a solvent to form a mixture; and
   (b) forming the dispersion from the mixture.

28. The method of claim 27, wherein the solvent comprises water.

29. The. method of claim 28, wherein the polymer comprises DNA.

30. The method of clam 29, wherein the DNA comprises single-stranded DNA.

31. The method of claim 30, wherein the single-stranded DNA comprises single-stranded DNA of a repeating sequence of base pairs GT.

32. The method of claim 31, wherein the repeating sequence has a length of 20 base pairs.

33. The method of claim 32, wherein step (b) comprises sonicating the mixture.

34. The method of claim 33, wherein step (b) further comprises centrifuging the mixture after the mixture is sonicated.

* * * * *